April 8, 1941.  J. J. WALLACE  2,237,721
COTTON RETAINER CONTROL FOR PRESS BOXES
Filed Nov. 24, 1939    2 Sheets-Sheet 1
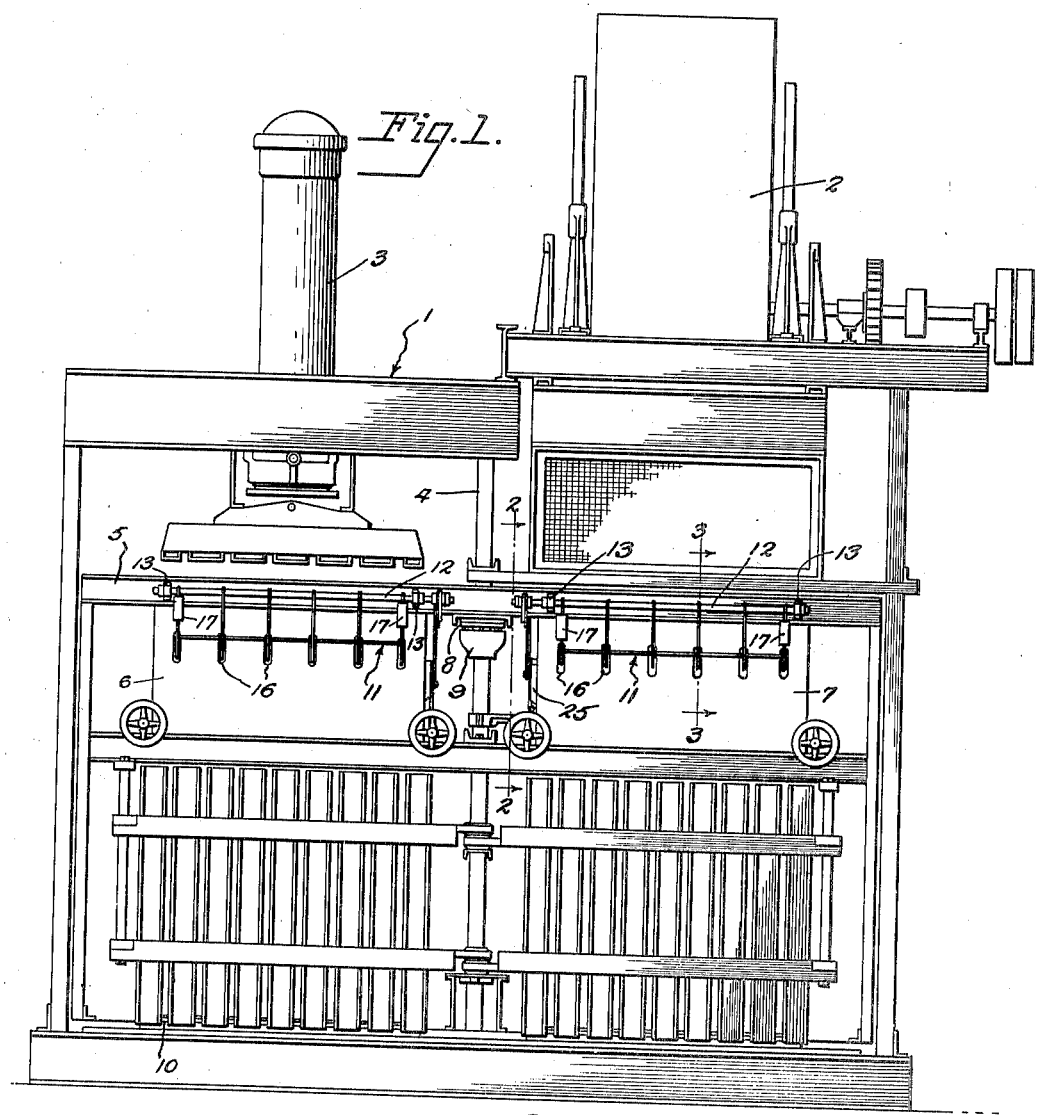
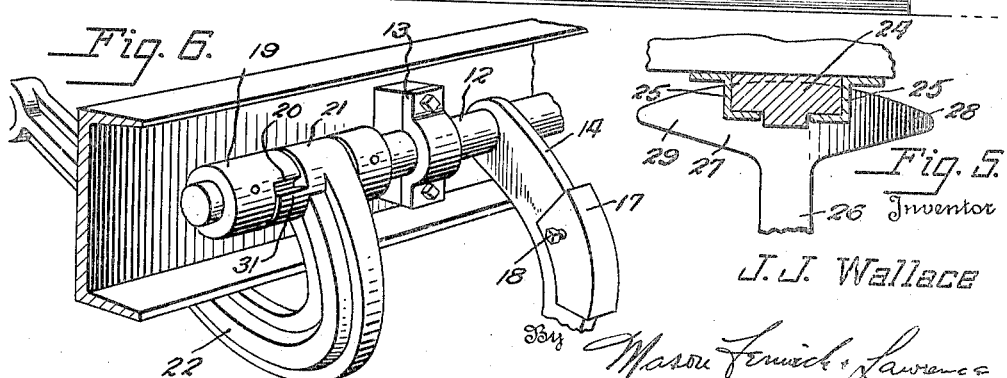
Inventor
J. J. Wallace
By Mason Fenwick & Lawrence
Attorneys April 8, 1941.   J. J. WALLACE   2,237,721
COTTON RETAINER CONTROL FOR PRESS BOXES
Filed Nov. 24, 1939   2 Sheets-Sheet 2
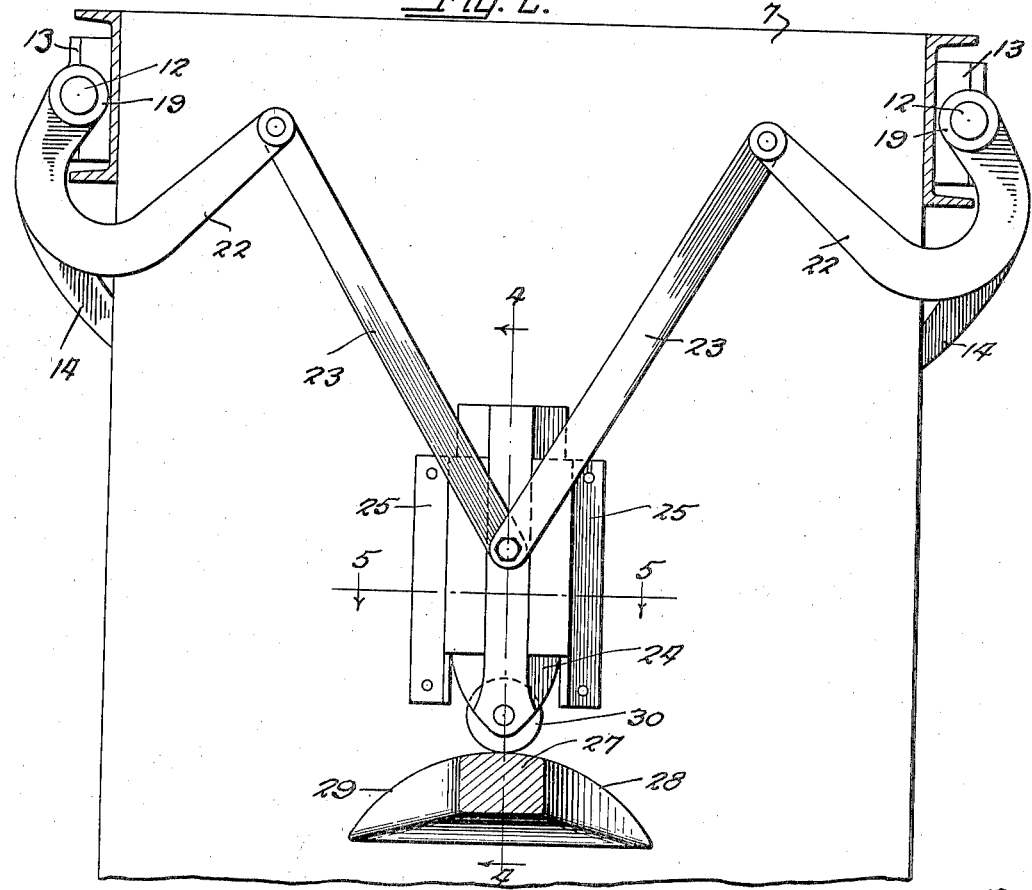
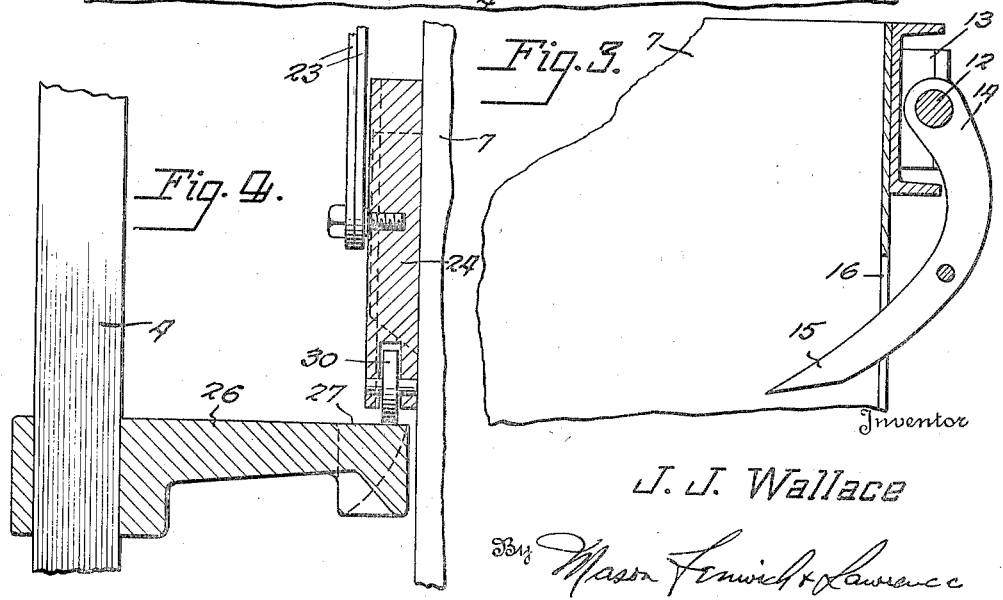
Inventor
J. J. Wallace
By Mason Fenwick & Lawrence
Attorneys Patented Apr. 8, 1941

2,237,721

UNITED STATES PATENT OFFICE 2,237,721

COTTON RETAINER CONTROL FOR PRESS BOXES

Jeffrey J. Wallace, Amite, La., assignor to Gullett Gin Company, Amite, La., a corporation of Louisiana Application November 24, 1939, Serial No. 306,004

1 Claim. (Cl. 100—30)

This invention relates to cotton presses of that type in which a pair of press boxes rotates about a pivot post in alternation between a tramper and ram for subjecting the cotton first to the tramping and then to the baling operations.

It is conventional with presses of this type to provide each press box, on opposite sides with a series of dogs or retainers so weighted that they automatically swing into the press box through slots in the sides of the press box, the purpose of the retainers being to hold down the cotton pressed by the tramper, so that the cotton will not expand upward upon the return stroke of the tramper.

It is old also, to provide means to prevent the retainers from returning into the press box when the box is under the hydraulic ram, after they have once been pushed out of the box by the initial inward movement of the ram plunger.

The object of the present invention is to provide an improved and simplified retainer mechanism and means for regulating the movements of the retainers to perform the functions above described.

Other objects of the invention will appear as the following description of a preferred and practical embodiment thereof proceeds.

In the drawings which accompany and form a part of the following specification, and throughout the several figures of which the same characters of reference have been employed to designate identical parts:

Figure 1 is a view in elevation, showing a cotton press of the type described, embodying the features of the subject invention;

Figure 2 is an end view of the upper part of one of the press boxes, parts being shown in section taken along the line 2—2 of Figure 1;

Figure 3 is a section taken along the line 3—3 of Figure 1;

Figure 4 is a section taken along the line 4—4 of Figure 2;

Figure 5 is a section taken along the line 5—5 of Figure 2; and

Figure 6 is a perspective view showing details of the invention.

Referring now in detail to the several figures, the numeral 1 represents, in general, a cotton press comprising the tramper 2 and hydraulic ram 3. Between the tramper and ram is the pivot post 4, about which the frame 5 rotates, from which the press boxes 6 and 7 are suspended. The frame 5 rests upon a bearing 8, supported by a collar 9 which is longitudinally slidable along said pivot post, being operated by means not shown, for lifting the press boxes from the sills 10 prior to rotating them, and for returning them to the sills after they have been rotated to opposite positions with respect to the tramper and ram.

The press boxes are provided on opposite sides with exteriorly mounted retainer units, which, in general, are designated by the reference character 11, and each of which comprises a shaft 12 suitably mounted as in bearings 13, and having affixed thereto at proper longitudinal intervals, the retainers 14. The shape of the retainers is preferably somewhat as shown in Figure 3, including end portions 15 which are projectable through slots 16 formed in the upper part of the press boxes on opposite sides thereof. The retainer units are so weighted that when in position of repose the ends 15 of the retainers project through the slots 16 into the press box and prevent the cotton which has been pushed down by the tramper from rising again when the tramper follower recedes. The tramper follower, not shown, is of conventional construction, having slots through which the projecting ends of the retainers pass as the tramper follower moves up and down.

In the embodiment of the invention herein illustrated and described, it is the retainers themselves which are weighted, being provided with weights 17 adjustably affixed as by the set screw 18, shown in Figure 6. These weights act to impart partial rotation to the shaft 12.

When the packing of the press box by the tramper has been completed, the upward pressure of the cotton against the retainers holds them in projected position, and they are in this position when the box is rotated to its position beneath the hydraulic ram. Upon the first downward movement of the ram plunger, the retainers will be pushed out of the press box against the bias of the weights 17, and must be kept out, or else they will swing into projected position over the top of the ram plunger and collide with the ram plunger upon its upward stroke. The means for controlling the operation of the retainers is as follows:

Each of the opposite shafts 12 has a collar 19 fixed thereto with means, in this case a shoulder 20, forming an abutment. Adjacent to the collar each shaft has rotatably mounted thereupon a sleeve 21, from which a rock arm 22 extends. The rock arms 22 are shown as bent upwardly along the inner end of the press box, that is, the end which is adjacent the pivot post 4. The free ends of said rock arms are connected by means of the links 23 to a weight 24, which is mounted to slide vertically in a guide 25 affixed to the outside of the end of the press box. A fixed arm 26 is mounted on the pivot post, extending toward the tramper, and carries at its end a weight support 27 having the cam-shaped ends 28 and 29. The weight 24 is preferably provided with a roller 30, and when the press box is rotated towards its position beneath the tramper, or away from said position, the roller rides on the respective cam-shaped ends 28 and 29 until it rests upon the top of the weight support 27, the weight then being in elevated position and the extent of elevation of the weight being augmented by the dropping of the press box upon the sills when the weight is in this intermediate position. When the press box is raised to rotate it, the weight 24 will descend and it will descend stil further when the press box is rotated so as to cause the roller 30 to ride down off of one of the cam-shaped ends of the weight support.

It will be observed in Figure 6 that the sleeve 21 is provided with a shoulder 31 adapted to abut against the shoulder 20 of the collar 19.

When the weight 24 moves to its low position, the rock arms 22 swing so as to rotate the sleeves 21 to raise the shoulders 31 so that said shoulders abut the shoulders 20 upon the collars 19 and prevent the retainer unit from rotating in a direction to project the retainers into the press box. When the weight 24 is lifted, the rock arms 22 are moved so as to rotate the sleeves 21 in a direction to move the shoulders 31 downwardly, giving sufficient room for movement of the shoulder 20 to permit the shafts 12 to rotate to a position in which the retainers are projected into the press box.

In operation, assuming the press box is beneath the tramper with the roller 30 in mid position, supporting the weight 24 in elevated position upon the weight support 27, the shoulders 31 are now withdrawn downwardly to permit the shafts 12 with the retainers to swing into projecting position under the urge of the weights 17. The tramper follower now reciprocates, the slots in said follower causing it to press the projected retainers without engaging them. Each time the tramper follower comes down, the retainers recede under the mass of the cotton beneath said follower, and automatically swing inward, above said cotton to hold it from spreading, when the tramper follower recedes. Eventually, the press box is filled by the tramper and the upward pressure of the cotton holds the retainers in projected position. The press box is now raised from the sills. This removes the support from the weight 24 but as the retainers are held in extended position by the cotton in the press box, the shoulders 20 and 31 are together and the mass of the weight 24 is not sufficient to force the shoulder 31 upward against the pressure of the cotton. Consequently, the weight 24 remains elevated until after the press box comes under the hydraulic ram. The first downward movement of the ram pushes the retainers out of the press box, rotating the shafts 12 so as to move the shoulders 20 of the collars 19 upward, the shoulders 31 of the sleeves 21 following them, in contact, under the urge of the weight 24, which now descends. The weight 24, therefore, acting through the shoulders 31, upon the shoulders 20, prevents the shafts 12 from rotating in such a direction as to again project the retainers into the press box, until such time as the weight is elevated upon the support 27 when the press box is again lowered upon the sills when beneath the tramper. The lifting of the weight will cause the shoulders 31 to descend, permitting the shoulders 20 to follow them under the urge of the weights 17.

From the above description it will be understood by those skilled in the art that I have provided an efficient and simplified construction and control for the cotton retaining mechanism.

While I have in the above description disclosed what I believe to be a preferred and practical embodiment of the invention, it will be understood to those skilled in the art that the specific details of construction and arrangement of parts as shown and described, are by way of illustration, and not to be construed as limiting the scope of the invention defined in the appended claim.

What I claim as my invention is:

In combination with a baling press having a tramper and a ram, a supporting post, and press boxes rotatably mounted about said post adapted to be moved alternately under the tramper and ram, retainer units mounted along the sides of said press boxes, each unit comprising a shaft, retainers secured thereto at longitudinal intervals, extending at one side of said shaft, and a counterbalancing weight secured to said shaft extending at the opposite side whereby said shaft is normally in a state of gravitational equilibrium with the retainers extending into the press box, a collar fixed to the end of said shaft adjacent said post, said collar having a shoulder, a lever at the end of the press box adjacent said post terminating in a sleeve surrounding said shaft adjacent said collar whereby said lever is pivotally mounted upon said shaft, said sleeve having a shoulder cooperable with the shoulder on said collar, a weight slidably mounted on said end of the press box, fixed means automatically lifting said weight and supporting it in elevated position when the press box is in position beneath the tramper, said weight being unsupported when the press box is in other positions, a connection between said weight and lever positioning said lever to hold the sleeve shoulder away from said collar shoulder when said weight is supported, permitting a range of oscillation of said shaft in which said retainers may freely swing inward and outward of said press box, said weight when unsupported, rocking said lever to engage said shoulders and thereby to oscillate said shaft to withdraw said retainers from said press box and hold them withdrawn while said weight is unsupported.

JEFFREY J. WALLACE.